US011164214B2

(12) United States Patent
Mengle et al.

(10) Patent No.: US 11,164,214 B2
(45) Date of Patent: Nov. 2, 2021

(54) STRUCTURED INFORMATIONAL LINK ANNOTATIONS

(71) Applicant: Google LLC, Mountain View, CA (US)

(72) Inventors: Advay Mengle, Sunnyvale, CA (US); Shreyas Doshi, Mountain View, CA (US); Venky Ramachandran, Cupertino, CA (US); Gaurav Garg, San Francisco, CA (US); Luke Hiro Swartz, San Francisco, CA (US); Poorva Hari Potdar, Union City, CA (US); Angela Yu-Yun Yeung, Cupertino, CA (US)

(73) Assignee: Google LLC, Mountain View, CA (US)

( * ) Notice: Subject to any disclaimer, the term of this patent is extended or adjusted under 35 U.S.C. 154(b) by 7 days.

(21) Appl. No.: 16/594,494

(22) Filed: Oct. 7, 2019

(65) Prior Publication Data

US 2020/0034885 A1 Jan. 30, 2020

Related U.S. Application Data

(63) Continuation of application No. 14/017,831, filed on Sep. 4, 2013, now abandoned.

(51) Int. Cl.
*G06Q 30/02* (2012.01)
(52) U.S. Cl.
CPC .................... *G06Q 30/0269* (2013.01)
(58) Field of Classification Search
None
See application file for complete search history.

(56) References Cited

U.S. PATENT DOCUMENTS

2007/0130126 A1\* 6/2007 Lucovsky .............. G06Q 30/02
2008/0065620 A1 3/2008 Puneet
(Continued)

FOREIGN PATENT DOCUMENTS

| CN | 102124483 A | 7/2011 |
| CN | 102841920 A | 12/2012 |
| KR | 10-2010-0130169 | 12/2010 |

OTHER PUBLICATIONS

Bill Slawski, "Google Search Result Annotations", retrieved from https://www.seobythesea.com/2011/08/google-search-result-annotations/ (Year: 2011).\*

(Continued)

*Primary Examiner* — Sam Refai
(74) *Attorney, Agent, or Firm* — Fish & Richardson P.C.

(57) ABSTRACT

Methods, systems, and apparatus include computer programs encoded on a computer-readable storage medium. A method includes: for each of a plurality of content items in an inventory of content items: identifying an entity associated with the content item and a plurality of page types for a vertical associated with a product or service described in the content item; locating a plurality of informational pages associated with the entity; classifying each informational page based on the page types; identifying queries associated with the entity, wherein a query is used as a selection criteria for delivering one or more content items associated with the entity; for each informational page of the plurality of informational pages determining relevant queries from the identified queries; and storing in a data structure an association between the content item, data associated with the relevant queries and associated informational pages.

20 Claims, 6 Drawing Sheets

(56) References Cited

U.S. PATENT DOCUMENTS

| | | | |
|---|---|---|---|
| 2009/0006375 A1* | 1/2009 | Lax | G06Q 30/02 |
| 2009/0024470 A1* | 1/2009 | Mandelson | G06Q 30/0277 705/14.73 |
| 2009/0089310 A1 | 4/2009 | Lara et al. | |
| 2009/0327264 A1 | 12/2009 | Yu et al. | |
| 2011/0125759 A1 | 5/2011 | Querel et al. | |
| 2011/0213655 A1 | 9/2011 | Assaf et al. | |
| 2012/0030015 A1 | 2/2012 | Brunsman et al. | |
| 2012/0030200 A1 | 2/2012 | Yu | |
| 2012/0123863 A1 | 5/2012 | Kaul et al. | |
| 2012/0150657 A1 | 6/2012 | Rubinstein et al. | |
| 2012/0265611 A1* | 10/2012 | Bookman | G06F 16/30 705/14.49 |
| 2013/0173639 A1 | 7/2013 | Chandra et al. | |
| 2013/0204706 A1 | 8/2013 | Tang et al. | |
| 2014/0123863 A1 | 5/2014 | Tian et al. | |

OTHER PUBLICATIONS

'www.wikipedia.com' [online] "Search advertising," Jun. 3, 2013, [retrieved on Feb. 3, 2017] Retrieved from Internet URLhttps://en.wikipedia.org/w/index.php?title=search_advertising&oldid=558109799> 2 pages.

'www.wikipedia.com' [online] "Web banner" Aug. 30, 2013, [retrieved on Feb. 3, 2017] Retrieved from Internet: URL<URL:https://en.wikipedia.org/w/index.php?title=Web banner&oldid=566958219> 3 pages.

'www.wikipedia.com' [online] "Web search engine," Sep. 1, 2013, [retrieved on Feb. 3, 2017] Retrieved from Internet URL<https://en.wikipedia.org/w/index.php?title=web_search_engline&oldid-571116429, 9 pages.

www.wikipedia.com [online] "Online Advertising," Aug. 30, 2013, [retrieved on Feb. 3, 2017] Retrieved from Internet URL<www.wikipedia.org/w/index.php?title=Online_advertising&oldid=570774387> 6 pages.

Alchin. "Pro Django," Apress, Jul. 9, 2013, pp. 84-86.

Coulouris et al. "Distributed Systems: Concepts and Design 5th edition," Addison-Wesley, May 7, 2011, 598 pages.

Extended European Search Report in European Application No. 17182088.9, dated Aug. 14, 2017, 12 pages.

Google, "Ad Sitelinks," google.com [online] Retrieved from the Internet: < URL: http://web.archive.org/web/20130717000441/http://www.google.com/ads/innovations/adsitelinks.html>, 2 pages, captured Jul. 17, 2013.

Google, "Ads: Ad Innovations: Dynamic Search Ads," google.com [online] Retrieved from the Internet: < URL: http://web.archive.org/web/20130717000510/http://www.google.com/ads/innovations/dynamicsearchads.html>, 2 pages, captured Jul. 17, 2013.

Google, "Dynamic search ads in AdWords Editor," support.google.com [online] [retrieved on Sep. 26, 2013], Retrieved from the Internet: < URL: https://support.google.com/adwords/editor/answer/65470?hl=en>, 3 pages, published prior to Sep. 4, 2013.

Google, "Sitelinks," support.google.com [online] Retrieved from the Internet: <URL: http://web.archive.org/web/20130815084724/https://support.google.com/webmasters/answer/47334?hl=en > 2 pages, Aug. 15, 2013.

Google, "Using, creating, and optimizing Dynamic Search Ads," support.google.com [online]. Retrieved from the Internet: < http://web.archive.org/web/20130523200855/https://support.google.com/adwords/answer/2471185?hl=en>, 4 pages, captured May 23, 2013.

International Search Report and Written Opinion in International Application No. PCT/US2014/054039, dated Dec. 30, 2014, 14 pages.

Mordkovich et al. "Low Cost Strategies for Attracting New Customers Using Google, MSN, Yahoo! & Other Search Engines," Mar. 19, 2007, pp. ii-7 and 158-163.

Office Action issued in Chinese Application No. 201480048674.7 dated Aug. 28, 2018, 40 pages (with English translation).

Office Action issued in European Application No. 14842350.2, dated Nov. 21, 2017, 11 pages.

Office Action issued in European Application No. 17182088.9, dated Dec. 1, 2017, 12 pages.

Office Action issued in European Application No. 17182088.9, dated Jun. 12, 2018, 14 pages.

Owen et al. "Mahout in Action," Manning Publications, ISBN1935182684, Oct. 17, 2011, [Table of Contents, Ch01-17, Appendix B, Appendix C, and Index] 400 pages.

Summons to Attend Oral Proceeding issued in European Application No. 14842350.2, dated Jun. 19, 2018, 12 pages.

Supplementary European Search Report in European Application No. 148423450.2, dated Feb. 2, 2017, 12 pages.

Tanenbaum et al. "Distributed Systems: Principles and Paradigms 2nd edition," Prentice Hall, Oct. 12, 2006, 242 pages.

* cited by examiner

STRUCTURED INFORMATIONAL LINK ANNOTATIONS

CROSS-REFERENCE TO RELATED APPLICATION

This is a continuation of U.S. application Ser. No. 14/017,831, filed Sep. 4, 2013, the disclosure of which is considered part of and is incorporated by reference in the disclosure of this application.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for associating content items with informational pages and queries that are relevant to the informational pages. The method includes: for each of a plurality of content items in an inventory of content items: identifying an entity associated with the content item and a plurality of page types for a vertical associated with a product or service described in the content item; locating a plurality of informational pages associated with the entity; classifying each informational page based on the page types; identifying queries associated with the entity, wherein a query is used as a selection criteria for delivering one or more content items associated with the entity; for each informational page of the plurality of informational pages determining relevant queries from the identified queries; and storing in a data structure an association between the content item, data associated with the relevant queries and associated informational pages.

In general, another aspect of the subject matter described in this specification can be implemented in methods that include a method for associating a content sponsor and a content item with associated informational pages. The method includes: identifying a content item and an entity associated with the content item; identifying a plurality of informational pages associated with the entity; determining a plurality of page types associated with informational content that are related to the entity; classifying each informational page based on the page types; determining which of the informational pages relate to the content item based on one or more criteria; and storing in a database an association between the content item, the content sponsor, and related informational pages based on page type.

In general, another aspect of the subject matter described in this specification can be implemented in computer program products. A computer program product is tangibly embodied in a computer-readable storage device and comprises instructions. The instructions, when executed by a processor, cause the processor to: for each of a plurality of content items in an inventory of content items: identify an entity associated with the content item and a plurality of page types for a vertical associated with a product or service described in the content item; locate a plurality of informational pages associated with the entity; classify each informational page based on the page types; identify queries associated with the entity, wherein a query is used as a selection criteria for delivering one or more content items associated with the entity; for each informational page of the plurality of informational pages determine relevant queries from the identified queries; and store in a data structure an association between the content item, data associated with the relevant queries and associated informational pages.

In general, another aspect of the subject matter described in this specification can be implemented in systems. A system includes a link and criteria identification system, an annotation serving system, an annotation rendering system, and a content selector. The content selector is configured to: receive a request for content; and identify a content item responsive to the request. The link and criteria identification system is configured to identify one or more informational pages associated with the content item based at least in part on a content sponsor associated with the content item and terms included in the request and/or the landing page associated with the content item. The annotation serving system is configured to: generate a link for an informational page of the one or more informational pages; and augment the content item with the generated link. The annotation rendering system is configured to provide the augmented content item responsive to the request.

These and other implementations can each optionally include one or more of the following features. The entity can be a content sponsor. Determining relevant queries from the identified queries can include determining one or more keywords for a given informational page and identifying a relevant query can include finding one or more queries that include the determined one or more keywords. A request for content can be received and a content item can be identified responsive to the request. One or more informational pages associated with the content item can be identified based at least in part on a content sponsor associated with the content item and terms included in the request and/or the landing page associated with the content item. A link can be generated for an informational page of the one or more informational pages, the content item can be augmented with the generated link and the augmented content item can be provided responsive to the request. Identifying a plurality of page types for a vertical associated with a product or service described in the content item can include retrieving a set of page types from a database based on the vertical. Identifying the plurality of page types can include evaluating a corpus of documents associated with a document sponsor to determine the page types. Evaluating the corpus can include evaluating titles of documents in the corpus including extracting n-grams from the titles that do not include a product, service or brand name associated with the content sponsor and using the extracted n-grams to identify the page types. A determination can be made as to which of the identified page types to assign to a content item by evaluating one or more of URL (Uniform Resource Locator) patterns or title n-grams. Locating a plurality of informational pages associated with the content sponsor can include receiving a list of informational pages associated with the content sponsor. Locating a plurality of informational pages associated with the content sponsor can include evaluating a corpus of documents associated with the content sponsor to identify the plurality of informational pages. Locating a plurality of informational pages associated with the content sponsor can include identifying a set of URLs that constitute informational links for the page types of the plurality of page types chosen from a total set of URLs associated with the content sponsor. The page types can be associated with informational needs of a user selected from how-to, buying guide, reviews, product walkthrough, product gallery, customer reviews, question and answer, live chat, technical specifications, technical support, top lists, or side-by-side comparisons. Identifying one or more informational pages can include selecting, based on one or more criteria, one or more informational pages from the identified informational pages and generating an informational link based on a selected informational page. A determination can be made as to a task associated with the request, wherein the task is located along a path toward conversion and wherein the criteria relates to furthering the user along the path toward conversion. The generated informational links can be assembled in an order and the assembled informational links can be provided along with the content item responsive to the request. A determination can be made as to a subset of the informational pages to present based on one or more criteria and augmenting can include presenting informational links associated with the subset. The criteria can be based on a function of a task that is inferred that the user is performing related to the request. A title for the generated link can be automatically constructed. The title can be automatically constructed based on one or more criteria including page type and available screen space. Locating a plurality of informational pages associated with the content sponsor can include submitting a request to a search system for the search system to locate informational pages that include one or more page type n-grams and receiving information from the search system identifying the located informational pages.

Particular implementations may realize none, one or more of the following advantages. Annotations can be added to a content item presented to a user which inform the user as to informational content available from a content sponsor, including informational content located on a landing page associated with the content item or at other locations designated or associated with the content item sponsor. The annotations can be presented in a structured, consistent manner which can create a predictable user experience in which the user knows what to expect when interacting with an annotation. Annotations can be provided that help fulfill an informational need of the user. Annotations can be provided that can move a user forward in a conversion funnel and thus provide a return on investment for the content item sponsor.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems and methods presented provide structured annotations for presentation along with content items. For example, a request for content can be received from a user device and a content item can be identified in response to the request. One or more informational pages associated with the content item can be identified based at least in part on a content sponsor associated with the content item and terms included in the request and/or on the landing page associated with the content item. A link can be generated for an informational page and the content item can be augmented with the generated link. The augmented content item can be provided to the user device in response to the request.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be manipulated in one or more ways before it is stored or used, so that certain information about the user is removed. For example, a user's identity may be manipulated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
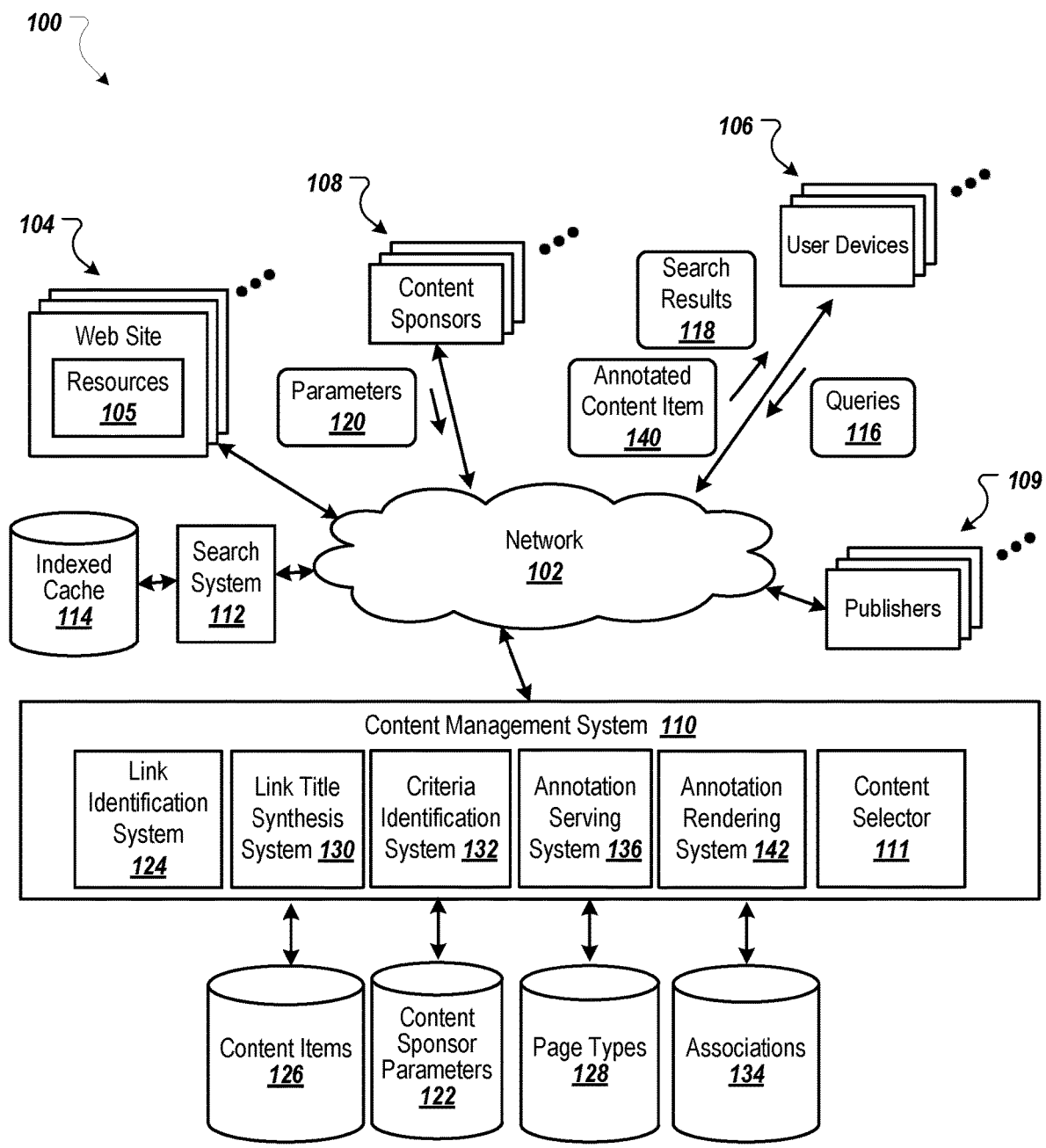
FIG. 1 is a block diagram of an example environment for providing an annotated content item to a user.

FIG. 1 is a block diagram of an example environment 100 for providing an annotated content item to a user. The example environment 100 includes a network 102, such as a local area network (LAN), a wide area network (WAN), the Internet, or a combination thereof. The network 102 connects websites 104, user devices 106, content sponsors 108, publishers, and a content management system 110. The example environment 100 may include many thousands of websites 104, user devices 106, and content sponsors 108. The content management system 110 may be used for selecting and providing content in response to requests for content. The content sponsors 108 can be, for example, advertisers. Other types of content sponsors are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can, for example, access an indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Locator) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116.

Based, for example, on data included in the request for content, a content selector 111 included in the content management system 110 can select content items that are eligible to be provided in response to the request, such as content items having characteristics matching the characteristics of a given slot. As another example, content items having selection criteria (e.g., keywords) that match the resource keywords or the search query 116 may be selected as eligible content items by the content selector 111. One or more selected content items can be provided to the user device 106 in association with providing an associated resource 105 or search results 118.

In some implementations, the content selector 111 can select content items based at least in part on results of an auction. For example, content sponsors 108 can provide bids specifying amounts that the content sponsors 108 are respectively willing to pay for presentation of their content items. In turn, an auction can be performed and the slots can be allocated to content sponsors 108 according, among other things, to their bids and/or the relevance of a content item to content presented on a page hosting the slot or a request that is received for the content item. For example, when a slot is being allocated in an auction, the slot can be allocated to the content sponsor 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

In some implementations, some content sponsors 108 prefer that the number of impressions allocated to their content and the price paid for the number of impressions be more predictable than the predictability provided by an auction. For example, a content sponsor 108 can increase the likelihood that its content receives a desired or specified number of impressions, for example, by entering into an agreement with a publisher 109, where the agreement requires the publisher 109 to provide at least a threshold number of impressions (e.g., 1,000 impressions) for a particular content item provided by the content sponsor 108 over a specified period (e.g., one week). In turn, the content sponsor 108, publisher 109, or both parties can provide data to the content management system 110 that enables the content management system 110 to facilitate satisfaction of the agreement.

For example, the content sponsor 108 can upload a content item and authorize the content management system 110 to provide the content item in response to requests for content corresponding to the website 104 of the publisher 109. Similarly, the publisher 109 can provide the content management system 110 with data representing the specified time period as well as the threshold number of impressions that the publisher 109 has agreed to allocate to the content item over the specified time period. Over time, the content management system 110 can select content items based at least in part on a goal of allocating at least a minimum number of impressions to a content item in order to satisfy a delivery goal for the content item during a specified period of time.

A content sponsor 108 can create a content campaign associated with one or more content items using tools provided by the content management system 110. For example, the content management system 110 can provide one or more account management user interfaces for creating and managing content campaigns. The account management user interfaces can be made available to the content sponsor 108, for example, either through an online interface provided by the content management system 110 or as an account management software application installed and executed locally at a content sponsor's client device.

A content sponsor 108 can, using the account management user interfaces, provide campaign parameters 120 which define a content campaign. The content campaign can be created and activated for the content sponsor 108 according to the parameters 120 specified by the content sponsor 108. The campaign parameters 120 can be stored in a content sponsor parameters datastore 122. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and/or one or more selection terms.

A user of a user device 106 may, for example, submit a search query 116 that is a query to fulfill an informational need of a user regarding a product or service. For example, the user may be looking for information about how to use a product, how to buy a particular kind of product, a comparison between similar products, or reviews of a product. The content management system 110 can annotate a content item of a content sponsor 108 and provide the annotated content item to the user device 106 to fulfill an informational need represented by such a search query 116 while also moving the user along a conversion funnel to increase ROI (Return On Investment) for the content sponsor 108. An annotated content item, for example, with links to informational content such as a buying guide or reviews, may be more useful for a user than a content item that includes products available for purchase but not other informational content about the products.

A link identification system 124 can, for each content item in an inventory 126 of content items, identify a content sponsor 108 associated with the content item and a set of page types for a vertical associated with a product or service described in the content item. The link identification system 124 can identify the set of page types for the vertical, for example, by querying a page types data store 128. For example, for a retail vertical, the pages types data store 128 may include a set of predefined page types including how-to guides, buying guides, and/or other page types. For a travel vertical, the page types data store 128 may include predefined page types of transportation, lodging, nearby-destinations, travel guide, and/or other page types. As described in more detail below, a set of page types can be programmatically generated.

The link identification system 124 can locate a set of informational pages associated with the content sponsor 108, such as by using the search system 112. Other approaches for locating informational pages are discussed in more detail below. The link identification system 124 can classify each informational page based on the page types. For example, a particular informational page can be classified as having a page type of buying guide. A link title synthesis system 130 can associate one or more titles with each informational page identified by the link identification system 124. Identification and generation of link titles is described in more detail below.

A criteria identification system 132 can identify selection criteria for the informational pages identified by the link identification system 124. For example, the criteria identification system 132 can identify queries associated with a content sponsor 108 in the content sponsor parameters datastore 122, such as queries that are used as selection criteria for delivering one or more content items associated with the content sponsor 108. The criteria identification system 132 can determine relevant queries from the identified queries for each informational page associated with the content sponsor 108. For example, the criteria identification system 132 can determine one or more keywords for a given informational page and identify relevant queries by finding one or more queries that include the determined one or more keywords. The criteria identification system 132 (or the link identification system 124) can store, in an associations datastore 134, for each content item associated with a content sponsor 108, an association between the content item, data associated with the relevant queries, and informational pages associated with the content item.

When the content management system 110 receives a request for content, the content selector 111 can identify a content item responsive to the request, as described above. An annotation serving system 136 can identify one or more informational pages associated with the content item, for example, by querying the associations datastore 134 using an identifier of the content sponsor 108 associated with the content item and terms included in the request for content. The annotation serving system 136 can rank and/or filter the identified informational pages, as described in more detail below, to determine a set of ranked and selected informational pages. The annotation serving system 136 can generate a link for each selected informational page and annotate (e.g., augment) the content item with the generated links, for example, using link titles determined by the link title synthesis system 130. The annotated content item can be provided to the requesting user device 106, as illustrated by an annotated content item 140. A user device can include tools for rendering content delivered by the content management system. In the example shown, an annotation rendering system 142 is used to display the annotated content item 140, including generated links and, for example, a header associated with the generated links, to the user of the user device 106.

Figure 2:
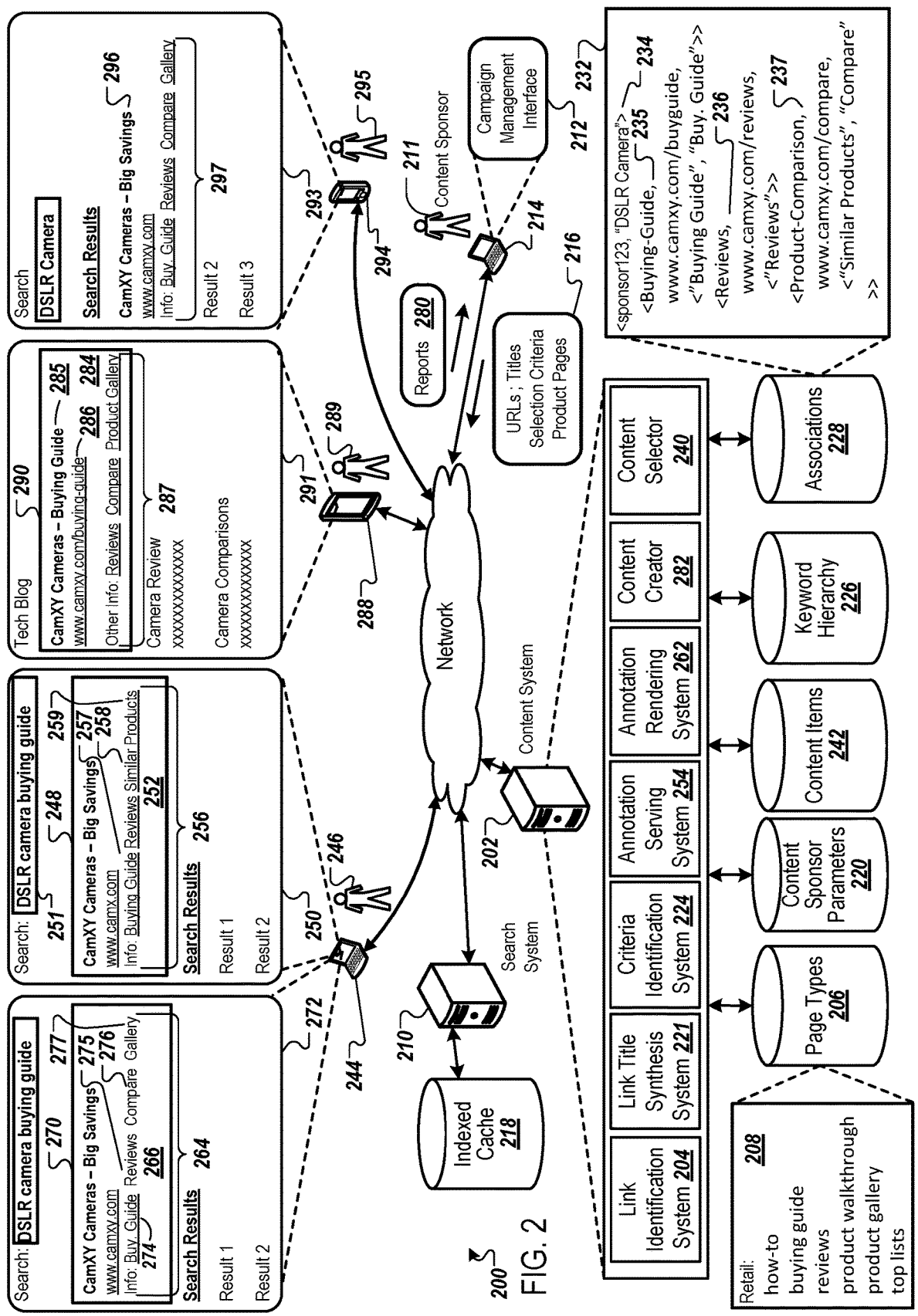
FIG. 2 is a block diagram of an example system for providing an annotated content item to a user.

FIG. 2 is a block diagram of an example system 200 for providing an annotated content item to a user. A content server 202 can provide content in response to requests for content. The content server 202 can augment (e.g., annotate) a content item with one or more links to informational pages that are associated with an entity (e.g., a content sponsor) that is associated with the content item. In some implementations, the informational pages are identified after a request for content is received. In some implementations, the informational pages are identified before the request is received.

A link identification system 204 can identify, for a given content sponsor, a set of informational links (e.g., URLs) for various page types. In some implementations, the link identification system 204 can identify page types based on a determined vertical. A vertical can be determined, for example, for each content sponsor, based on information stored or known about the content sponsor. As another example, a vertical can be determined for a content item based on information included in or associated with the content item. The link identification system 204 can query a page types datastore 206 to determine a set of page types associated with a vertical. For instance, as illustrated by example data 208, the link identification system 204 can determine page types of "how-to", buying guide, reviews, product walkthrough, product gallery, and top lists for a retail vertical.

In some implementations, a set of one or more n-grams are associated with each page type. For example, n-grams of "buying guide", "purchase guide", and "how to choose" can be associated with the page type "buying guide". Associations of n-grams to page types can be stored in the page types data store 206. The page types data store 206 can include a version of a page type definition, including mappings of verticals to page types and page types to associated n-grams, for each of multiple languages (e.g., English, German, Japanese).

In some implementations, the link identification system 204 programmatically determines a set of page types, such as for a particular content sponsor or for a group of content sponsors. For example, the link identification system 204 can identify a set of product-related pages that include product names or keywords, for the content sponsor or for the group of content sponsors. For example, the set of product-related pages can be identified using a search system 210, such as by querying for product names and keywords and using a domain restricted search using the domain of a given content sponsor. As another example, a set of product-related pages can be received by a content sponsor. For example, a content sponsor 211 can use a campaign management user interface 212 presented on a content sponsor client device 214 to provide a set of links to product-related pages, as illustrated by a product-pages input included in example content sponsor inputs 216.

The link identification system 204 can process each identified product-related page. For each product-related page, the link identification system 204 can identify a title for the product-related page, create a copy of the title, remove product names and keywords from the copy of the title, optionally remove stop words from the copy of the title, optionally remove n-grams that match a content sponsor name or a site name, and optionally perform stemming on remaining n-grams included in the copy of the title. The link identification system 204 can identify the remaining n-grams included in the copy of the title as candidate page types. For instance, an example title of a product-related page may be "Example.com—Product Reviews for Camera Y". The site-name n-gram of "Example.com", the stop word "for", and the product-name n-gram of "Camera Y" can be removed from a copy of the example title, leaving the text "Product Reviews" in the copy of the example title. The n-grams "Reviews" and "Product Reviews" can be identified as candidate page types, for example. In some implementations, candidate page-types are identified by processing one or more page heading elements in a manner similar to the processing of page titles described above.

In some implementations, some candidate page types are weighted as being more or less relevant than other candidate page types. For example, candidate page types that are adjacent to a product name or keyword in a product-related page title can be weighted higher than candidate page types that are not adjacent to a product name or keyword. The link identification system 204 can determine a frequency of occurrence for each candidate page type across all of the processed product-related pages. The link identification system 204 can select a set of page types from the candidate page types, such as by selecting page types associated with the top N (e.g., ten) highest frequencies of occurrence across product-related pages, or selecting page types having a frequency of occurrence across product-related pages that is higher than a threshold frequency.

The link identification system 204 can identify, for a given content sponsor, a set of informational links (e.g., URLs) associated with the selected page types. The informational links can be identified, for example, from a set of total URLs that are associated with (e.g., owned) by the content sponsor. The set of total URLs for the content sponsor can be identified, for example, by the search system 210. The search system 210 can, for example, identify (e.g., "crawl") the URLs that are associated with one or more domains associated with the content sponsor and can store information on the identified URLs in an indexed cache 218. The link identification system 204 can query the search system 210 to determine the total set URLs for the content sponsor.

As another example, the link identification system 204 can identify the total set of URLs for the content sponsor by identifying a set of pre-defined landing page URLs that are associated with the content sponsor, such as by querying a content sponsor parameters datastore 220. As yet another example, in some implementations, the content sponsor can provide the total set of URLs for the content sponsor, such as by providing landing page and/or other URLs. For example, the content sponsor 211 can use the campaign management user interface 212 to provide the total set of URLs for the content sponsor, as illustrated by a URLs input included in the example content sponsor inputs 216.

In some implementations, the link identification system 204 identifies informational links from the total set of URLs for a content sponsor by analyzing the title of each page corresponding to a URL in the total set of URLs. For example, the link identification system 204 can determine if a title includes an n-gram that is associated with a particular page type. In some implementations, the link identification system 204 determines whether the title includes a page-type related n-gram after stemming and stop-word removal processing. If a title includes a page-type related n-gram, the page that includes the title can be identified as an informational page of the particular page type and the address associated with the page can be identified as an informational link associated with the particular page type.

In some implementations, the link identification system 204 uses the search system 210 to identify informational pages associated with a particular content sponsor. For example, the link identification system 204 can request the search system 210 to perform searches that include page-type related n-grams and a site restriction on a domain associated with the content sponsor. For example, the search system 210 can perform a search of 'buying guide' site:example.com" to determine buying-guide pages associated with the content sponsor having a domain of "example.com". As another example, the search system 210 can perform a search of 'buying guide' site:example.com 'Camera Y' to find buying guides for a "Camera Y" product sold by a content sponsor having a domain of "example.com".

In some implementations, the link identification system 204 identifies informational links by matching patterns, such as regular expressions, to sets of URLs associated with a particular content sponsor. For example, the link identification system can search for and identify patterns in URLs provided by the content sponsor, identify informational links based on analyzing page titles, and identify informational links using the search system 210, and/or other sets of URLs. For example, each URL in a set of URLs associated with a content sponsor of "example" may have a pattern of "www.example.com/products/{id}?view=comparison{otherOptionalParams}, where each URL in the set is a product comparison page. If another URL which matches the pattern is identified, such as "www.example.com/products/

2392348?view=comparison&tracking=campaignId", the URL can be automatically identified as a product comparison page.

Other approaches can be used to identify informational pages. For example, content of landing pages associated with a content sponsor can be evaluated, such as to determine whether a link included in a landing page is an informational link (e.g., such as by identifying page-type related n-grams in link title text). As another example, in some implementations a content sponsor can include metadata in pages associated with the content sponsor (e.g., HTML metadata), and the link identification system 204 can identify informational pages by determining which pages have metadata indicating a page is an informational page. As yet another example, the link identification system 204 can query a page classification system (not shown), where the page classification system includes a datastore of page classifications. The page classification system may, for example, classify pages using a machine learning model.

Information can be associated with each identified informational link. For example, a link title synthesis system 221 can associate one or more titles with each informational page identified by the link identification system 204. A title can be, for example, used as a link title in an annotation used for a content item. The link title synthesis system 221 can determine a title for an informational page, for example, by identifying a title element associated with the informational page or by using a page-type n-gram as a link title (e.g., all buying guide pages may get a link title of "buying guide"). As another example, the link title synthesis system 221 can receive a title for an informational page from a content sponsor, such as illustrated by a "titles" input included in the example content sponsor inputs 216. As yet another example, the link title synthesis system 221 can programmatically generate a title, such as by using one or more of a content sponsor name, a page type, frequent queries associated with the informational page, and/or content from the informational page. For example, a generated link title can be "56 Product Reviews from example.com". Frequent queries are discussed in more detail below.

In some implementations, a snippet of text is associated with an informational page, in addition to a title that is associated with the informational page. The snippet and the title can each be included, for example, in an annotation associated with the informational page. A snippet can be received, for example, from a snippet generator (not shown) or from the search system 210. As another example, a snippet can be generated from the content of the informational page, such as by identifying a non-boilerplate portion of text included in the informational page, such as the first N words or sentences of non-boilerplate text. Other approaches for generating a snippet can be used. A snippet can be included in an annotation, for example, before or after a link associated with the informational page. For example, an annotation can include a link for a tennis racquet buying guide informational page and can include a snippet associated with the informational page. The annotation can appear, for example, as "Tennis Racquet Buying Guide—The best racquet on the market is . . . " or "The best racquet on the market is . . . Tennis Racquet Buying Guide"

Other information can be associated with each identified informational link. For example, a criteria identification system 224 can identify selection criteria for the informational pages identified by the link identification system 204. For example, the criteria identification system 224 can identify queries associated with one or more content sponsors in the content sponsor parameters datastore 220, such as queries that are used as selection criteria for delivering one or more content items associated with a given content sponsor. The criteria identification system 224 can determine relevant queries from the identified queries for each informational page. For example, the criteria identification system 224 can determine one or more keywords for a given informational page and identify relevant queries by finding one or more queries that include the determined one or more keywords. In some implementations, the criteria identification system 224 receives selection criteria from a content sponsor, such as illustrated by a selection criteria input included in the example content sponsor inputs 216.

In some implementations, the criteria identification system 224 identifies criteria for an informational page by analyzing the title of the informational page. For example, for each informational page, the criteria identification system 224 can create a copy of the title, remove page-type n-grams from the title, optionally perform stemming and stop-word removal on the copy of the title, optionally remove site names from the copy of the title, and identify remaining n-grams in the copy of the title. The remaining n-grams can be identified as candidate criteria for the informational page. For example, suppose a title of an informational page is "example.com—Product Reviews for Camera Y". A "Product Reviews" page-type n-gram, a stop-word "for", and a site name "example.com" can be removed from a copy of the title, leaving the copy of the title as "Camera Y". N-grams of "Y" and "Camera Y" can be identified as candidate criteria. In some implementations, candidate criteria that are adjacent to a page-type n-gram in the original title can be weighted higher than candidate criteria that are not adjacent to a page-type n-gram.

In some implementations, candidate criteria are identified by processing one or more page heading elements in a manner similar to the processing of page titles described above. In some implementations, candidate criteria are identified by analyzing URLs of informational pages, such as by identifying a particular URL pattern that is shared across a set of URLs for the content sponsor, identifying one or more portions of the pattern as corresponding to a candidate keyword, and identifying particular candidate keywords by identifying portions of respective URLs that correspond to the identified URL-pattern portions.

The criteria identification system 224 can process each informational page for a content sponsor to determine candidate criteria for the content sponsor. In some implementations, the criteria identification system 224 identifies a frequency of occurrence of each candidate criteria across all of the informational pages. The criteria identification system 224 can, for example, select as criteria candidate criteria that have a frequency of occurrence across the informational pages that is greater than a threshold frequency. As another example, the criteria identification system 224 can select as criteria the candidate criteria that have the N (e.g., ten) highest frequencies. As yet another example, the criteria identification system 224 can select criteria using a formula that takes into account frequency of candidate criteria across informational pages and whether a respective candidate criterion is used as a selection criterion by the content sponsor for a content item associated with the content sponsor.

In some implementations, a keyword hierarchy 226 data structure is accessed to identify keywords to associate with informational pages. For example, the keyword hierarchy 226 can include multiple sets of related keywords, where each set of related keywords is associated with a concept, with keywords in the set ordered from general to specific.

For example, a set of keywords related to a camera of a model XYZ9 from a camera maker named Camera-Maker-A can include the keywords "camera", "digital camera", "Camera-Maker-A camera", "XYZ9", and "Camera-Maker-A XYZ9", with the keywords being ordered from more general to more specific. The criteria identification system 224 can determine that a selected criterion for an informational page is included in a set of related keywords in the keyword hierarchy 226 and can identify one or more other keywords in the set to use as other selected criteria for the informational page. For example, the criteria identification system 224 can identify "Camera-Maker-A camera buying guide" and "XYZ buying guide" as additional selected criteria for the informational page based on criteria "Camera-Maker-A XYZ9" being an existing criteria for the informational page.

In some implementations, the criteria identification system 224 can identify a set of frequent queries most often associated with a particular candidate informational page. For example, the criteria identification system 224 can, for a given candidate informational page, identify queries which result in the candidate informational page being displayed in a search result or that result in a content item associated with the candidate informational page being selected for a content request that is associated with one or more identified queries. For example, the content item can be configured to have the candidate informational page as a landing page. In addition to impressions of search results or content items relating to the identified queries, other factors, such as a click through rate of a search result or content item can be used to identify and rank the frequent queries.

For example, a particular number of queries can be identified as frequent queries for the candidate informational page. For example, a relevance score can be determined for each query associated with the candidate informational page (e.g., based on impressions, click-through rate) and queries having relevance scores above a threshold can be identified or queries having a top N (e.g., five) relevance scores can be identified. For each identified query, the link identification system 204 can use the query to determine whether the associated candidate informational page is identified as an informational page for the content sponsor and a page type for the informational page. For example, the queries can be evaluated in a manner similar to the evaluation of titles and URLs described above. In general, the content system 202 can use one or more approaches of evaluating titles, URLs, page headings, and queries to identify informational pages and page types of identified informational pages.

For example, a query of "dslr camera buying guide" can be identified as a frequent query for a candidate informational page having a URL of "www.example.com/cameras?guide=1". A page type n-gram of "buying guide" can be identified in the query of "dslr camera buying guide", and the candidate informational page can be identified as an informational page having a page type of "buying guide". Frequent queries can be provided to the link title synthesis system 221 and the link title synthesis system 221 can use a frequent query to generate a title to be associated with an informational page. For example, if a query of "dslr cameras buying guide" is provided to the link title synthesis system 221 for an informational page having a URL of "www.example.com/cameras?guide=1", the link title synthesis system 221 can generate a link title to be associated with the informational page that is or that includes "DSLR Camera Buying Guide".

The criteria identification system 224 (or the link identification system 204) can store, in an associations datastore 228, for each content item for which selection criteria and informational pages have been identified, an association between the content item, data associated with the selection criteria determined to be relevant to the content item, and informational pages associated with the content item. The data in the associations datastore 228 can be keyed, for example, by a content sponsor identifier and by selection criteria. For example, for each content sponsor identifier and selection criteria combination, one or more tuples can be stored that include a page type, an informational page URL, and a link title. For instance, example associations data 232 keyed by multi-valued key 234 of a content sponsor id of "sponsor123" (which can be, for example, an identifier associated with the content sponsor 211) and selection criteria of "DSLR Camera" includes tuples 235, 236, and 237 for page types of buying guide, reviews, and product comparison, respectively.

When the content system 202 receives a request for content, a content selector 240 can select a content item to serve in response to the request, such as identifying a content item in a content items data store 242. For example, a request for content can be received from a user device 244 of a user 246, for a content slot 248 included in a web page 250 displayed on the user device 244. The web page 250 is a search results page presented to the user 246 in response to the user 246 entering a search query 251 of "DSLR camera buying guide". The content selector 240 can select, for example, a content item 252. The content item 252 can be associated, for example, with the content sponsor 211.

An annotation serving system 254 can select one or more informational pages associated with the content item 252, for example, by querying the associations datastore 228 using an identifier of the content sponsor 211 and the search query 251. The annotation serving system 254 can generate a link for each selected informational page and annotate (e.g., augment) the content item 252 with the generated links. For example, the content item 252 includes an annotation 256 which includes links 257, 258, and 259. The links 257, 258, and 259 are associated with the tuples 235, 236, and 237, respectively.

The annotation 256 can be displayed to the user using an annotation rendering system 262. In the example shown, annotation 256 includes a header (e.g., "Info:"). Other headers can be used, such as "Learn More". Headers can be descriptive of the informational content that is associated with the one or more of the informational links provided or of the form of a call to action that moves the user farther along the conversion funnel. In some implementations, the annotation rendering system 256 selects a header based on an amount of available screen space. For example, the annotation rendering system 256 can select a header so that the annotation 256 occupies one line of the content item 252. The annotation rendering system 256 (or the annotating serving system 254) can also select titles for the links 257, 258, and 259 based on available screen space.

A generated header may include information identifying the content sponsor and information about selection criteria. For example, suppose selection criteria associated with the content item 252 is "CameraBrand DSLR ZY200" from example.com and that informational pages identified by the link identification system 204 are associated with criteria of "DSLR Cameras". In such an instance, a header can be "About DSLR cameras", "From example.com", or "More about DSLR cameras from example.com", to name a few examples.

The annotation rendering system 256 can select titles based on how many items (e.g., links) are shown in an annotation. For example, if a larger number of items are to be shown, shorter titles can be used, and if a smaller number of items are to be shown, longer titles can be used. For example, an annotation 264 can be included in a content item 266. The content item 266 can be provided to the user device 244 in response to a request for content for a content slot 270 included in a search results page 272. The annotation 264 includes items 274, 275, 276, and 277. Since the annotation 264 includes more items than the annotation 256, shorter titles may be used for the items included in the annotation 264 as compared to items included in the annotation 256. For example, the item 274, which is a link to a buying guide, has a title of "Buy. Guide", while a corresponding link 257 has a longer title of "Buying Guide".

As shown in the annotation 264, some items in an annotation (e.g., items 275, 276, and 277) can be "badges", or words to flag or mark the annotation 264 and/or the content item 266. A badge can inform the user about informational content that is available from the content sponsor associated with the content item 266 (e.g., the content sponsor 211), such as information available from a landing page associated with the content item 266 (e.g., reviews, product comparison, or a product gallery). A badge, for example, may not be a link, meaning the badge may not respond specifically to user interaction. If a user selects a badge such as the item 275, 276, or 277, for example, the selection action may be interpreted as a selection of the content item 266, which can result in a display of a landing page associated with the content item 266. The link 274 may, for example, be a link to the landing page associated with the content item 266, a link to a particular section of the landing page, or a link to a different web page associated with the content sponsor 211. Badges to include in an annotation can be determined, for example, by analyzing page heading elements of the landing page in a manner similar to the determination of candidate page-types based on page heading elements, as described above.

The annotation serving system 254 may use various approaches to rank and/or filter the items included in an annotation. For example, the annotation serving system may select zero or one item (e.g., link, badge) for every page type, up to a threshold number of items (e.g., seven), so that a diversity and balance of page types are included in the annotation. The threshold number of items can be predefined (e.g., seven), or can be dynamically determined based on the length of potential title text for candidate items that may be included in the annotation.

In some implementations, candidate items for an annotation may be ranked based on relevance to a query associated with the request for content for which the content item is selected. For example, for the annotation 256, the associated content item 252 may have been selected based on the search query 251 of "DSLR camera buying guide". Informational links associated with the page type of buying guide may be ranked higher by the annotation serving system 254 than informational pages of other page types for the given vertical. In this example, one informational page associated with the content sponsor 211 has a page type of buying guide, but in other examples, multiple informational pages having a page type of buying guide can be selected and included in the annotation 256, based on the buying guide page type having a higher weight than other page types. In some implementations, a page type can be ranked higher than other page types if the page type corresponds to selection criteria associated with the content item that includes the annotation, or with other criteria, such as being associated with a user task that is inferred or a user's determined current activity or location in a conversion funnel.

The annotation serving system 254 can use other approaches for filtering or ranking candidate items considered for inclusion in an annotation. For example, the annotation serving system can select items so that each item is at a same or similar level of granularity, such as is maintained in the keyword hierarchy datastore 226. For example, if the annotation serving system 254 includes in an annotation a link to a buying guide for a particular DSLR camera, the annotation serving system 254 may also select a link to a reviews page for the same DSLR camera rather than selecting a link to a reviews page for DSLR cameras in general or for some other camera model.

A content sponsor (e.g., the content sponsor 211) can receive reports 280 which can include information related to user interaction with the content items that include annotations, including interactions with items included in annotations. The reports 280 can include information about interactions with annotations that can be associated with various other user interactions, such as conversion actions. In some implementations, the content sponsor 211 can use the campaign management user interface 212 to register for or to opt out of inclusion of annotations in content items associated with the content sponsor 211. In some implementations, the content sponsor 211 can register for or opt out of automatic creation and/or serving of content items whose content includes information about and/or links to informational pages that have been determined for the content sponsor by the link identification system 204.

For example, a content creator 282 can automatically create a content item 284 based on informational content identified by the link identification system 204. For example, the content item 284 includes a title 285 and a link 286, based on the link identification system 204 identifying the link 284 as a link to an informational page. The content item 284 includes an annotation 287 that includes links for reviews, product comparison, and a product gallery, respectively.

In some implementations, the content creator 282 automatically creates the content item 284 and presents the content item 284 to the content sponsor 211 (e.g., on the campaign management user interface 212) as a suggestion for a new content item for the content sponsor 211 to include in a content campaign. When the content sponsor 211 approves the suggestion, the campaign can be activated and the content item 284 can be served in response to requests for content that are received. In some implementations, the content item 284 is automatically created and served in response to requests for content without specific approval from the content sponsor 211. That is, the content sponsor 211 may have registered to have content items automatically created and served without requiring specific approval of each created content item. The content item 284 can be provided, for example, to a user device 288 of a user 289, for presentation in a content slot 290 included in a web page 291. The content item 284 can be selected, for example, based at least in part on the content item 284 having associated keywords that match, for example, the content of the web page 291.

In some implementations, the annotation serving system 254 creates annotations that can be included in other types of content items. For example, the annotation system 254 can create an annotation that can be used to augment a search result generated by the search system 210. For example, a search results web page 293 is displayed on a user device 294 of a user 295. The search results web page 293 includes a search result 296. The search result 296 includes an annotation 297 created by the annotation serving system 254 and displayed by, for example, the annotation rendering system 262. The link identification system 204 can, for example, determine informational pages associated with an entity (e.g., a publisher, a content sponsor) associated with the search result 296 and the annotation serving system 254 can create the annotation 297 which includes links to the identified informational pages, such as links to a buying guide, reviews, a product comparison, and/or a product gallery, as shown in the annotation 297. In some implementations, links identified by the link identification system 204 can be merged or combined in the annotation 297 with other links (e.g., other site links) identified, for example, by the search system 210 or some other system.

Although generally described above as operations being performed, in order, by the link identification system 204, the link title synthesis system 221, the criteria identification system 224, the annotation serving system 254, and the annotation rendering system 262, operations can be performed in different orders and by different systems. The functionality of two or more systems can be combined into a single system. For example, the link title synthesis system 221 and the criteria identification system 224 can be combined. As another example, the criteria identification system 224 can identify a set of keywords for a content sponsor before the link identification system 204 identifies informational pages, and the link identification system 204 can use the identified keywords for locating informational pages.

Figure 3:
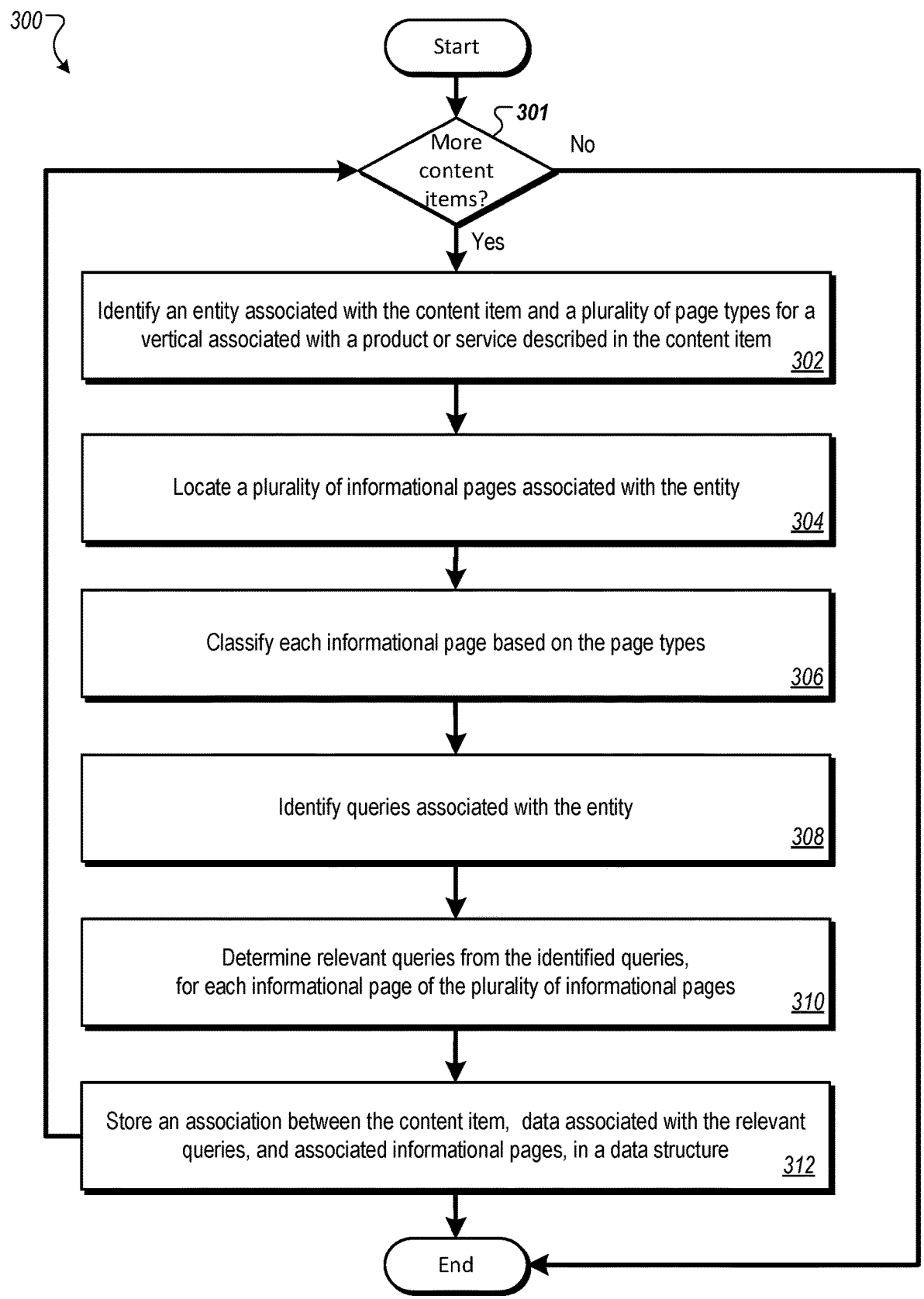
FIG. 3 is a flowchart of an example process for associating content items with informational pages and queries that are relevant to the informational pages.

FIG. 3 is a flowchart of an example process 300 for associating content items with informational pages and queries that are relevant to the informational pages. The process 300 can be performed, for example, by the content management system 110 described above with respect to FIG. 1, or the content server 202 described above with respect to FIG. 2.

A determination is made as to whether there is another content item to process in an inventory of content items (301). For example, the process 300 can be performed for each of a plurality of content items in the inventory of content items. If all of the content items have been processed (e.g., there are no more content items to process), the process 300 ends.

If there is a content item to process, an entity associated with the content item and a plurality of page types for a vertical associated with a product or service described in the content item are identified (302). The entity can be, for example, a content sponsor and the content item can be, for example, an advertisement. As another example, the content item can be a search result and the entity (e.g., a publisher, content sponsor) can be associated with a resource that is associated with the search result.

A page type can be associated with an informational need of a user. In some implementations, a set of page types is retrieved from a database based on the vertical. For example, the database can include a predefined set of page types for each of multiple verticals. Page types can include, for example, for a retail vertical, how-to guide, buying guide, reviews, product walkthrough, product gallery, customer reviews, question and answer, live chat, technical specifications, technical support, top lists, or side-by-side comparisons.

In some implementations, a corpus of documents associated with a document sponsor is evaluated to determine the page types. For example, a corpus of documents associated with a particular content sponsor or with a set of content sponsors can be evaluated. In some implementations, when evaluating the corpus of documents, titles of documents in the corpus can be evaluated including the extraction of n-grams from the titles that do not include a product, service or brand name associated with the content sponsor. The extracted n-grams can be used to identify the page types.

A plurality of informational pages associated with the entity are located (304). In some implementations, a list of informational pages associated with the content sponsor is received, such as from the content sponsor. In some implementations, a corpus of documents associated with the content sponsor is evaluated to identify the plurality of informational pages. For example, a set of URLs that constitute informational links for the page types can be chosen from a total set of URLs associated with the content sponsor.

Each informational page is classified based on the page types (306). In some implementations, determining which of the identified page types to assign to a content item includes evaluating URL patterns. For example, a URL pattern can be identified that is associated with a particular page type and if the informational page matches the URL pattern, the informational page can be determined to be of the particular page type. In some implementations, determining which of the identified page types to assign to a content item includes evaluating title n-grams. For example, an informational page can be classified as a particular page type if the title of the informational page includes a page type n-gram (e.g., after optional stemming and stopword removal). Other approaches can be used to classify the informational page based on page type.

Queries associated with the entity are identified (308), wherein a query is used as selection criteria for delivering one or more content items associated with the entity. In some implementations, the content sponsor provides the queries. In some implementations, query terms can be determined by analyzing title n-grams or URL patterns of identified informational pages.

For each informational page of the plurality of informational pages, relevant queries are determined from the identified queries (310). For example, one or more keywords can be determined for a given informational page and identifying a relevant query can include finding one or more queries that include the determined one or more keywords.

An association between the content item, data associated with the relevant queries, and associated informational pages is stored in a data structure (312). The association can be keyed, for example, by an identifier of the content sponsor associated with the content item and data associated with the relevant queries.

Figure 4:
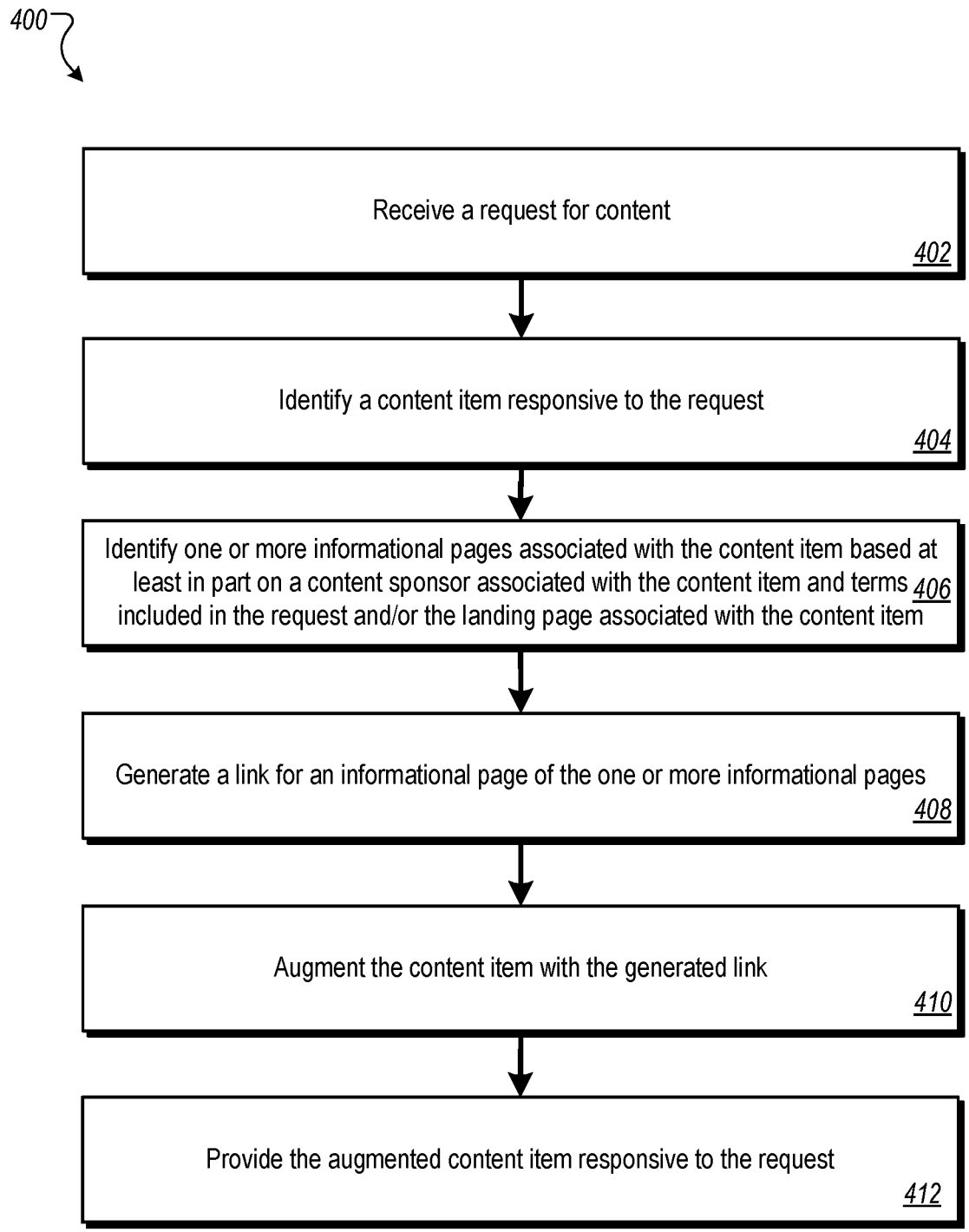
FIG. 4 is a flowchart of an example process for providing an annotated content item to a user.

FIG. 4 is a flowchart of an example process 400 for providing an augmented content item to a user. The process 400 can be performed, for example, by the content management system 110 described above with respect to FIG. 1, or the content server 202 described above with respect to FIG. 2.

A request for content is received (402). For example, the request can be received from a user device for a content item to be presented in a content slot.

A content item responsive to the request is identified (404). For example, an auction can be performed and a content item with a highest associated bid or a highest auction score (e.g., a score that is computed as a function of a bid and/or a quality measure) can be identified.

One or more informational pages associated with the content item are identified (406). The one or more informational pages can be identified based at least in part on a content sponsor associated with the content item and terms included in the request and/or the landing page associated with the content item.

A link is generated for an informational page of the one or more informational pages (408). One or more informational pages can be selected from the identified informational pages based on one or more criteria. The criteria can be based on a function of a task that is inferred that the user is performing related to the request. The task can be located along a path toward conversion and the criteria can relate to furthering the user along the path toward conversion. An informational link can be generated based on a selected informational page. In some implementations, a title can be automatically constructed for the generated link, such as based on one or more criteria including page type and available screen space.

The content item is augmented with the generated link (410). For example, the generated link can be included in, appended to, or otherwise visually associated with the content item.

The augmented content item is provided responsive to the request (412). For example, the augmented content item can be provided to a user device for presentation in a content slot.

Figure 5:
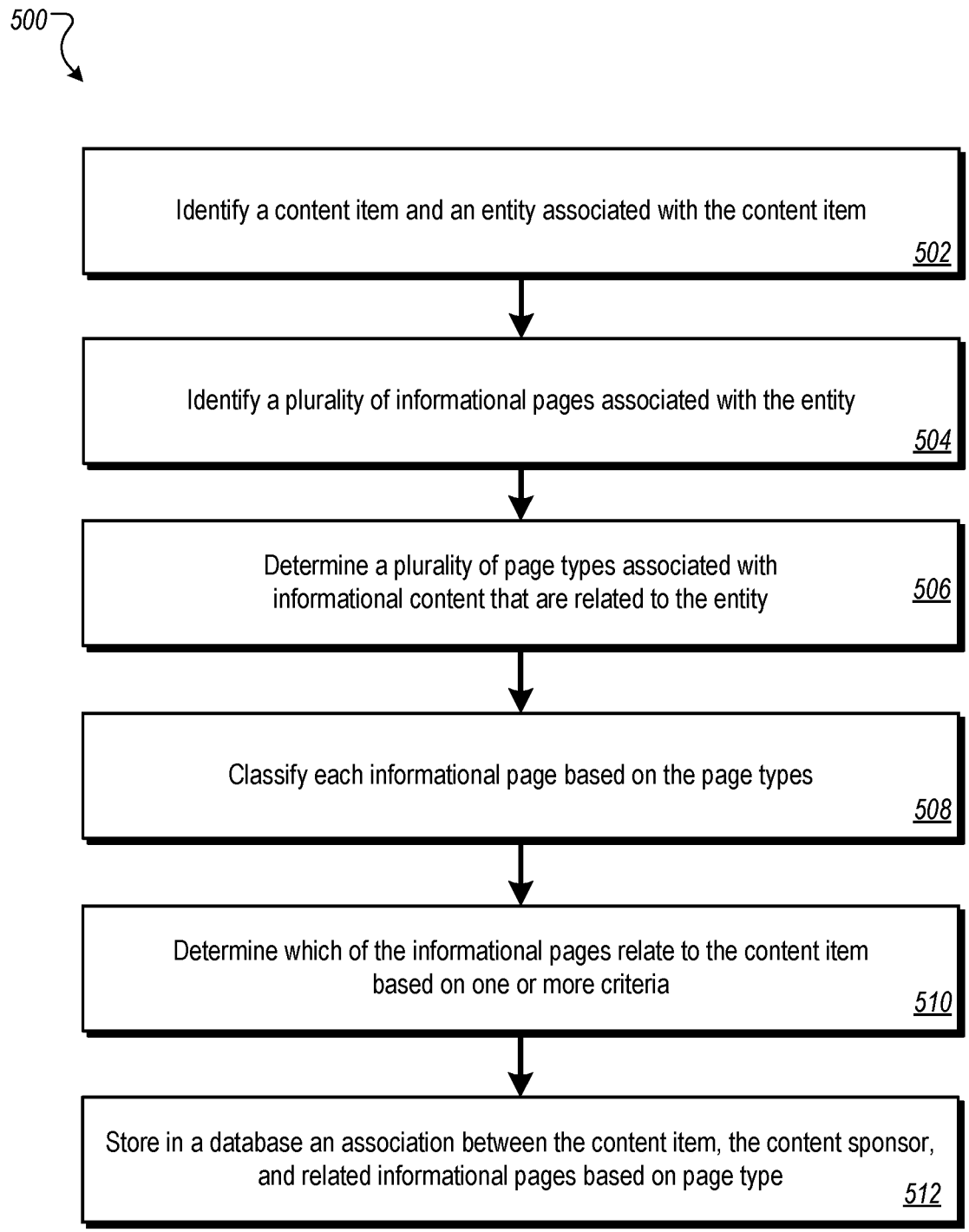
FIG. 5 is a flowchart of an example process for associating a content sponsor and a content item with associated informational pages.

FIG. 5 is a flowchart of an example process 500 for associating a content sponsor and a content item with associated informational pages. The process 500 can be performed, for example, by the content management system 110 described above with respect to FIG. 1, or the content server 202 described above with respect to FIG. 2.

A content item and an entity associated with the content item are identified (502). The entity can be, for example, a content sponsor and the content item can be, for example, an advertisement. As another example, the content item can be a search result and the entity (e.g., a publisher, content sponsor) can be associated with a resource that is associated with the search result.

A plurality of informational pages associated with the entity are identified (504). In some implementations, a list of informational pages associated with the content sponsor is received, such as from the content sponsor. In some implementations, a corpus of documents associated with the content sponsor is evaluated to identify the plurality of informational pages. For example, a set of URLs that constitute informational links for the page types can be chosen from a total set of URLs associated with the content sponsor.

A plurality of page types associated with informational content that are related to the entity are determined (506). In some implementations, a set of page types is retrieved from a database based on a vertical associated with the entity. In some implementations, a corpus of documents associated with the entity is evaluated to determine the page types.

Each informational page is classified based on the page types (508). In some implementations, determining which of the identified page types to assign to a content item includes evaluating URL patterns. In some implementations, determining which of the identified page types to assign to a content item includes evaluating title n-grams.

A determination is made as to which of the informational pages relate to the content item based on one or more criteria (510). The one or more criteria can include selection criteria which are used to determine when to deliver the content item, content of the content item, or content of a landing page associated with the content item.

An association between the content item, the content sponsor, and related informational pages based on page type is stored in a database (512). The association can be keyed, for example, by an identifier of the content sponsor.

Figure 6:
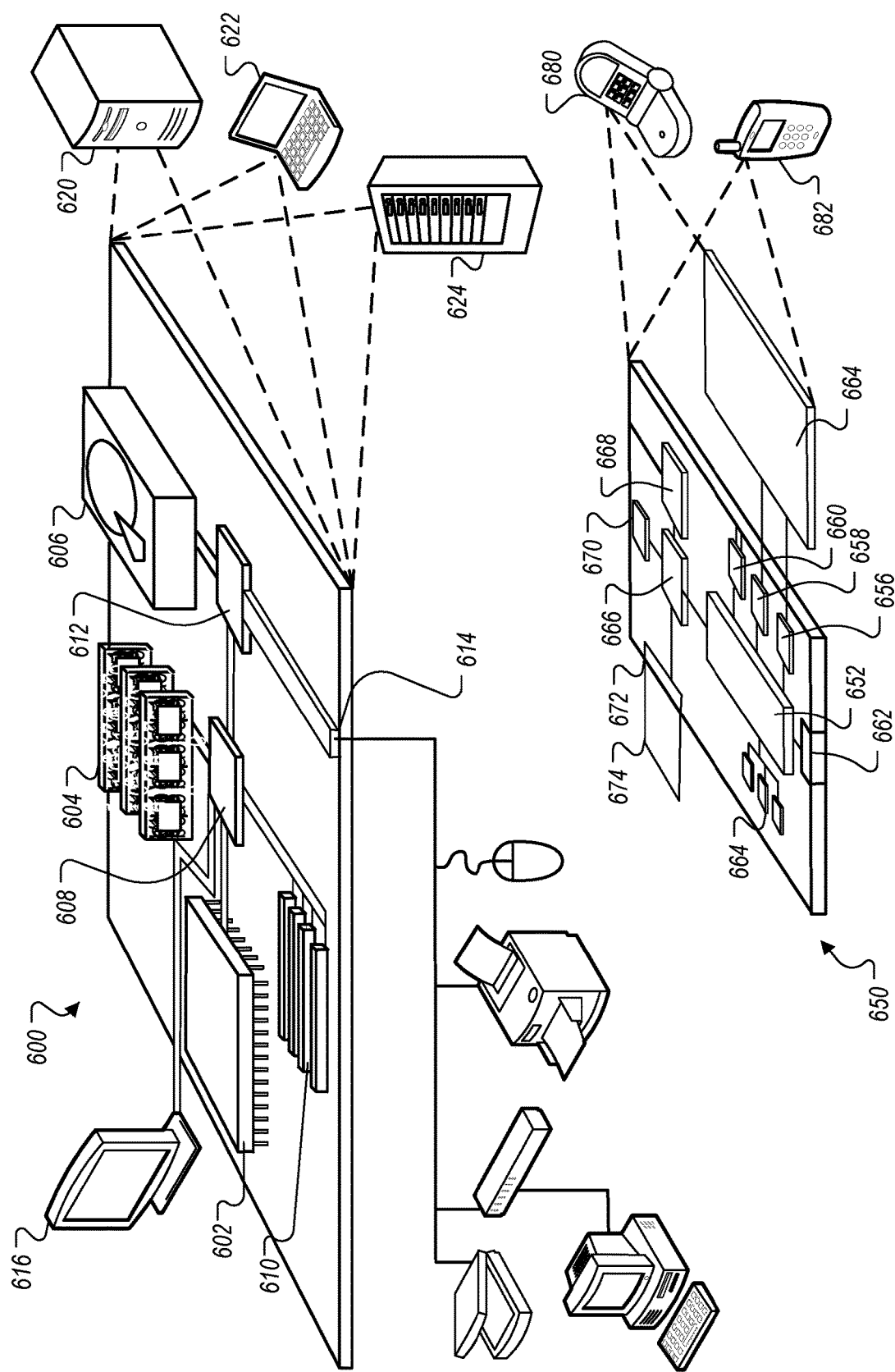
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. The computer-readable medium is not a propagating signal. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is illustrative only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
   locating, by one or more servers, a plurality of informational pages of a web site that is linked to by a content item;
   determining, by the one or more servers and for the content item, a set of relevant informational pages from among the plurality of informational pages based on a comparison between text presented by the set of relevant informational pages and selection criteria used to trigger distribution of the content item; and
   storing, in a data structure, information specifying that the set of relevant informational pages are deemed relevant to the content item;
   subsequent to the storing:
      receiving multiple different requests, each of the different requests including different search queries that were submitted by users;
      selecting, by the one or more servers, the content item for delivery responsive to each of the different requests;
      using the data structure, selecting different informational pages from among the set of relevant informational pages for each of the different requests based on the different search queries included in the different requests; and
      responsive to each given request from among the different requests:
         generating, based on content of the different informational page and the different search query, link text that differs from a URL of the different informational page selected based on the different search query included in the given request;
         dynamically augmenting, by the one or more servers and after receiving the given request, the content item to include a particular link to the different informational page selected based on the different search query included in the given request, wherein the content item is visually augmented to include a different link for each different request, and wherein the particular link presents, within the content item, the link text that differs from the URL of the different informational page, and causes a client device to request the URL of the different informational page in response to interaction with the particular link; and
         providing the dynamically augmented content item in a page presented at the client device, wherein the dynamically augmented content item causes the client device to request the URL of the different informational page in response to interaction with the link text that differs from the URL of the different informational page.

2. The method of claim 1, further comprising generating each of the different links.

3. The method of claim 2, wherein generating each of the different links comprises generating each of the different links based on content of the informational page for which the different link is being generated.

4. The method of claim 3, wherein generating each of the different links based on content of the informational page for which the different link is being generated comprises generating a title for the different link based on a title of the informational page for which the different link is being generated.

5. The method of claim 4, wherein generating the title comprises generating the title based on an amount of screen space available for presentation of the content item.

6. The method of claim 1, wherein determining a set of relevant informational pages for the content item comprises initiating a site-specific search that is limited to the website linked to by the content item.

7. The method of claim 1, wherein dynamically augmenting the content item comprises inserting multiple different links to multiple different informational pages from among the set of relevant informational pages for presentation in a determined order.

8. A system comprising:
   a memory storing machine readable instructions; and
   one or more servers configured to interact with the memory and execute the machine readable instructions, wherein execution of the machine readable instructions cause the one or more servers to perform operations comprising:
      locating a plurality of informational pages of a web site that is linked to by a content item;
      determining, for the content item, a set of relevant informational pages from among the plurality of informational pages based on a comparison between text presented by the set of relevant informational pages and selection criteria used to trigger distribution of the content item; and storing, in a data structure, information specifying that the set of relevant informational pages are deemed relevant to the content item;

subsequent to the storing:

receiving multiple different requests, each of the different requests including different search queries that were submitted by users;

selecting the content item for delivery responsive to each of the different requests;

using the data structure, selecting different informational pages from among the set of relevant informational pages for each of the different requests based on the different search queries included in the different requests; and responsive to each given request from among the different requests:

generating, based on content of the different informational page and the different search query, link text that differs from a URL of the different informational page selected based on the different search query included in the given request;

dynamically augmenting, after receiving the given request, the content item to include a particular link to the different informational page selected based on the different search query included in the given request, wherein the content item is visually augmented to include a different link for each different request, and wherein the particular link presents, within the content item, the link text that differs from the URL of the different informational page, and causes a client device to request the URL of the different informational page in response to interaction with the particular link; and providing the dynamically augmented content item in a page presented at the client device, wherein the dynamically augmented content item causes the client device to request the URL of the different informational page in response to interaction with the link text that differs from the URL of the different informational page.

9. The system of claim 8, wherein the instructions cause the one or more servers to perform operations comprising generating each of the different links.

10. The system of claim 9, wherein generating each of the different links comprises generating each of the different links based on content of the informational page for which the different link is being generated.

11. The system of claim 10, wherein generating each of the different links based on content of the informational page for which the different link is being generated comprises generating a title for the different link based on a title of the informational page for which the different link is being generated.

12. The system of claim 11, wherein generating the title comprises generating the title based on an amount of screen space available for presentation of the content item.

13. The system of claim 8, wherein determining a set of relevant informational pages for the content item comprises initiating a site-specific search that is limited to the web site linked to by the content item.

14. The system of claim 8, wherein dynamically augmenting the content item comprises inserting multiple different links to multiple different informational pages from among the set of relevant informational pages for presentation in a determined order.

15. A non-transitory computer readable medium storing instructions that, upon execution by one or more computing devices, cause the one or more computing devices to perform operations comprising:

locating a plurality of informational pages of a web site that is linked to by a content item;

determining, for the content item, a set of relevant informational pages from among the plurality of informational pages based on a comparison between text presented by the set of relevant informational pages and selection criteria used to trigger distribution of the content item; and storing, in a data structure, information specifying that the set of relevant informational pages are deemed relevant to the content item;

subsequent to the storing:

receiving multiple different requests, each of the different requests including different search queries that were submitted by users;

selecting the content item for delivery responsive to each of the different requests;

using the data structure, selecting different informational pages from among the set of relevant informational pages for each of the different requests based on the different search queries included in the different requests; and responsive to each given request from among the different requests:

generating, based on content of the different informational page and the different search query, link text that differs from a URL of the different informational page selected based on the different search query included in the given request;

dynamically augmenting, after receiving the given request, the content item to include a particular link to the different informational page selected based on the different search query included in the given request, wherein the content item is visually augmented to include a different link for each different request, and wherein the particular link presents, within the content item, the link text that differs from the URL of the different informational page, and causes a client device to request the URL of the different informational page in response to interaction with the particular link; and providing the dynamically augmented content item in a page presented at the client device, wherein the dynamically augmented content item causes the client device to request the URL of the different informational page in response to interaction with the link text that differs from the URL of the different informational page.

16. The non-transitory computer readable medium of claim 15, wherein the instructions cause the one or more computing devices to perform operations comprising generating each of the different links.

17. The non-transitory computer readable medium of claim 16, wherein generating each of the different links comprises generating each of the different links based on content of the informational page for which the different link is being generated.

18. The non-transitory computer readable medium of claim 17, wherein generating each of the different links based on content of the informational page for which the different link is being generated comprises generating a title for the different link based on a title of the informational page for which the different link is being generated.

19. The non-transitory computer readable medium of claim 18, wherein generating the title comprises generating the title based on an amount of screen space available for presentation of the content item.

20. The non-transitory computer readable medium of claim 15, wherein determining a set of relevant informational pages for the content item comprises initiating a site-specific search that is limited to the website linked to by the content item.

* * * * *